Nov. 19, 1935.  A. H. ROOS  2,021,201
MICROMETER KEY GAUGE
Filed Feb. 9, 1932
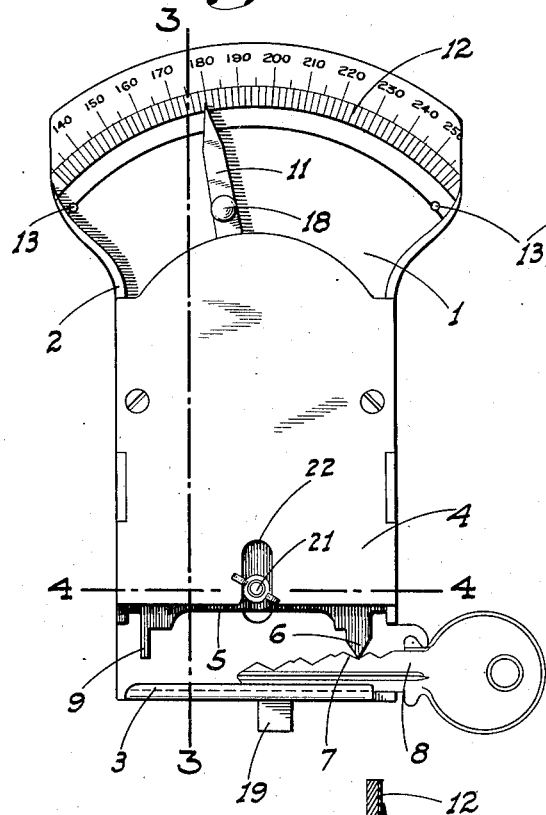
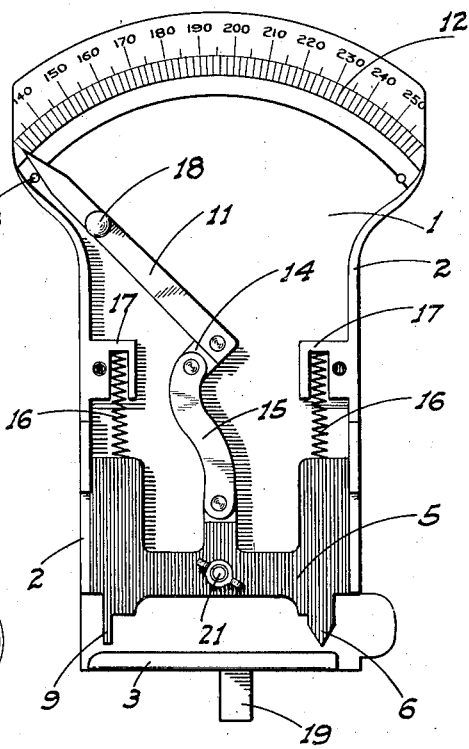
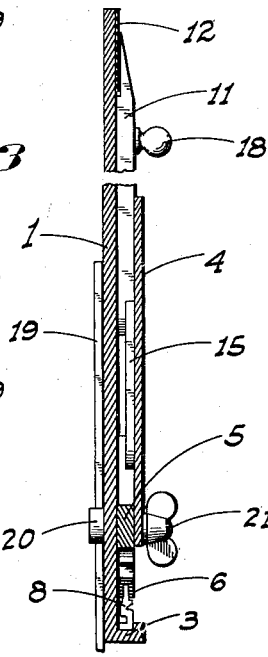
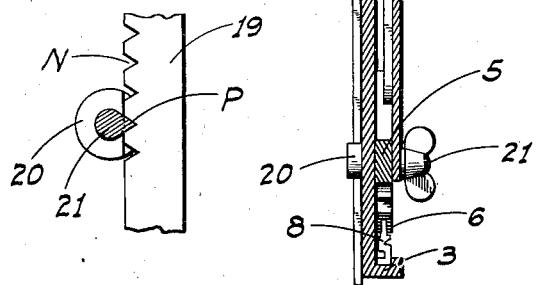
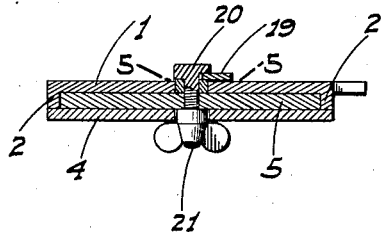
INVENTOR
*A. H. Roos*
BY
ATTORNEY Patented Nov. 19, 1935

2,021,201

UNITED STATES PATENT OFFICE 2,021,201

MICROMETER KEY GAUGE

Axel H. Roos, Chico, Calif.

Application February 9, 1932, Serial No. 591,783

2 Claims. (Cl. 33—147)

This invention relates to micrometer gauges and particularly to one for use in connection with keys of pin and tumbler locks to determine the depth of the notches in the keys, when they have been duplicated from a pattern or master key.

It sometimes happens in making such duplications that one or more of the notches are cut to an insufficient depth so that all the tumblers will not be released or moved to their proper positions when the key is inserted in the lock. The difference in the depth of the notches in functioning and non-functioning keys is minute and cannot be detected by the eye. It is therefore a hard matter for the locksmith to determine just where the trouble is and the key has to be touched up more or less blindly while being occasionally tried out in the lock.

The principal object of my invention is to avoid this labor consuming and unsatisfactory method of procedure by providing a notch-depth gauge so arranged that upon the placing of a key in position relative to the gauge to test the depth of any predetermined notch, such depth will be instantly and automatically indicated without any setting or adjusting of any part by the operator being necessary. When a reading has been thus obtained from a duplicate key and compared with that obtained from the insertion of the pattern key in the gauge, the difference, if any, in the depth of the corresponding notches will be at once evidenced and corrections may be accordingly made in the duplicate key.

Thus time is saved in making the necessary alterations to the keys and the accuracy of the alterations is easily determined. The gauge may also be of service in checking up the keys after they are made to determine their condition relative to the pattern key before giving them to the customer.

As will be seen hereinafter, the gauge is a combination one, usable for measuring both cylinder type and flat keys. It can also be used as an indicator for truing up work in a machine, with the use of a clamp to hold it in a tool-post.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a front view of my improved gauge as in use.

Fig. 2 is a similar view with the face plate removed and with the parts in their normal non-operative position.

Fig. 3 is a vertical section on the line 3—3 of Fig. 1.

Fig. 4 is a sectional plan on the line 4—4 of Fig. 1.

Fig. 5 is an enlarged section on the line 5—5 of Fig. 4.

Referring now more particularly to the characters of reference on the drawing, the numeral 1 denotes the back plate of the gauge having upstanding side flanges 2 which terminate short of the bottom and top of the plate, and an outwardly projecting upwardly facing channel 3 along the bottom which forms a guide and supporting ledge for the key to be gauged. A cover plate 4 engages the flanges 2 and is removably secured to the base, the top and bottom edges of the cover being short of the top and bottom of the base, as shown in Fig. 1.

Movably fitted between the flanges 2 and the base and cover plates for vertical movement is a slide 5. This slide at one side has a wedge shaped or taper sided finger 6 for engagement with the V or round notches 7 of a key 8 of a certain type; and also has another straight sided finger 9 at the other side for engagement with the straight sided or rectangular notches of keys of another type. The fingers depend from the slide and are of course vertically alined with the key supporting ledge, so that when a key is slid into place in the ledge channel from end to end, the corresponding finger may be engaged with any notch of the key, as shown in Fig. 1.

An indicating pointer 11 is pivoted at its lower end on the base plate 1 centrally between the sides and above the slide, this pointer reading against a dial 12 mounted on the base above the cover and graduated in thousandths of an inch. The pointer is relatively long and the dial is relatively wide, so that very small movements or changes of depth can be readily seen on the dial. Stop pins 13 on the base adjacent the ends of the dial limit the movement of the pointer. Projecting radially from the pivot of the pointer on the same side as the lowest numbered graduations of the dial is a boss or short arm 14, to which a depending link 15 is pivoted, the lower end of which is pivoted on the slide centrally of its width.

Downward pressure on the slide therefore moves the pointer toward the lower or zero end of the dial, and such pressure is normally maintained on the slide so as to hold the pointer against the corresponding stop pin, by compression springs 16 between the top of the slide and abutments 17 formed on the base. The pointer engages the stop and limits the downward movement of the slide so as to hold the fingers 6 and 9 clear of the key supporting ledge, the distance between the bottom of the fingers and the upper surface of the ledge being slightly less than the depth of a key from its back to the bottom of any notch. The lowest graduation on the dial is not therefore zero but a figure corresponding to said distance between the bottom of the channel and the bottom of the two fingers, which are on the same level.

When a key is to be gauged the slide is initially raised by advancing the pointer about the dial by means of an outwardly projecting button 18 thereon, which enables the key 8 to be slid into the channel 3 without interference from the corresponding finger. When the key notch to be gauged is lined up with the finger 6, the pressure on the button is released and the spring action forces the slide down so that said finger enters the adjacent notch, as shown in Fig. 1. The pointer is of course still advanced and the reading on the dial indicated thereby will represent the distance from the bottom of the notch to the back of the key. If the pattern key is then placed in the gauge the pointer should give the same reading for the corresponding notch and if it does not, the difference in the readings will indicate the difference in depth in thousandths of an inch and the alterations may be accordingly made in the incorrect key.

I may also add an attachment whereby the device may serve as a depth gauge for other purposes. This attachment comprises a vertical gauge bar 19 disposed behind the base plate and depending below the same. This bar is adjustably secured for vertical movement to the clamping head 20 of a screw 21 which projects through and is mounted in the bottom portion of the slide. The lower portion of the cover plate 4 is vertically slotted as at 22 to accommodate the base of the nut of the screw when the slide is moved vertically, and the base plate is similarly slotted at the back to permit of vertical movement of the screw. The bar 19 depends a certain predetermined and definite distance below the bottom of the base and channel 3. In use the bar is extended below the base a greater distance than the depth of the hole etc. to be measured and it is then projected into the hole to engage the bottom of the same. The gauge body is then depressed which brings the bottom of the base against the top surface about the hole, and causes the pointer to be advanced. If the reading thus obtained (with suitable allowance for the particular arrangement of dial figures as previously described if such arrangement is used) is subtracted from the known extended length of the bar, the difference will be the exact depth of the hole.

In altering the projecting extent of the bar, it must always be moved a distance equal to or a multiple of the normal distance between the ledge 3 and the ends of the fingers. Said bar therefore, on the side engaged by the clamping head 20, is V notched at predetermined spaced points as at N, said notches being engaged by a projection P on the corresponding side of the screw stem 21 adjacent the head.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A micrometer key gauge comprising a back plate having upstanding side flanges which terminate short of the bottom and top of the plate, an outwardly projecting ledge along the bottom edge of the plate to form a guide and support for a key, a cover plate secured across the flanges and terminating short of the top and bottom edges of the back plate, a slide fitted for movement between the back plate and cover plate and guided between the flanges, a finger on the bottom edge of the slide normally projecting below the cover plate toward the ledge and adapted to engage the notches of a key moved along the ledge, and a micrometer indicating means mounted on the back plate and connected in cooperative relation with the slide whereby the indicating means will function with movement of the slide.

2. A micrometer key gauge comprising a back plate having upstanding side flanges which terminate short of the bottom and top of the plate, an outwardly projecting ledge along the bottom edge of the plate to form a guide and support for a key, a cover plate secured across the flanges and terminating short of the top and bottom edges of the back plate, a slide fitted for movement between the back plate and cover plate and guided between the flanges, a finger on the bottom edge of the slide normally projecting below the cover plate toward the ledge and adapted to engage the notches of a key moved along the ledge, a dial formed on the back plate beyond the cover plate, a pointer pivoted at a point between the back plate and cover plate and projecting beyond the latter to move over the dial, a short arm on the pointer and a link pivoted to the arm and to the slide whereby with movement of the slide motion will be imparted to the pointer.

AXEL H. ROOS.